(12) United States Patent
Thompson et al.

(10) Patent No.: US 8,240,041 B2
(45) Date of Patent: Aug. 14, 2012

(54) TURBINE PIN REMOVAL

(75) Inventors: Andrew Thompson, Hendersonville, NC (US); David S. Strait, Lyle, WA (US); John Brooks, Portland, OR (US); David Sorensen, Sherwood, OR (US); David Briggs, Newberg, OR (US)

(73) Assignee: Climax Portable Machine Tools, Inc., Newberg, OR (US)

( * ) Notice: Subject to any disclaimer, the term of this patent is extended or adjusted under 35 U.S.C. 154(b) by 1009 days.

(21) Appl. No.: 12/207,465

(22) Filed: Sep. 9, 2008

(65) Prior Publication Data

US 2010/0058566 A1     Mar. 11, 2010

(51) Int. Cl.
*B23P 6/00*     (2006.01)

(52) U.S. Cl. ....................................................... 29/889.1

(58) Field of Classification Search ................. 29/889.1, 29/252, 254, 255
See application file for complete search history.

(56) References Cited

U.S. PATENT DOCUMENTS

| | | | |
|---|---|---|---|
| 4,545,106 A * | 10/1985 | Juengel | 29/563 |
| 6,453,657 B1 * | 9/2002 | Teravainen | 59/7 |
| 2002/0073541 A1 * | 6/2002 | Wei et al. | 29/889.1 |
| 2007/0193247 A1 * | 8/2007 | Daniels et al. | 59/7 |
| 2008/0134528 A1 * | 6/2008 | Dickinson | 33/293 |

FOREIGN PATENT DOCUMENTS

NZ     ZA200100646     * 10/2001

* cited by examiner

*Primary Examiner* — David Bryant
*Assistant Examiner* — Moshe Wilensky
(74) *Attorney, Agent, or Firm* — Dascenzo Intellectual Property Law, P.C.

(57) ABSTRACT

Embodiments of the present disclosure provide systems, apparatus, and methods to remove a pin from a hole including a rotor blade pin from a rotor turbine.

21 Claims, 4 Drawing Sheets

TURBINE PIN REMOVAL

TECHNICAL FIELD

Embodiments of the present invention relate to the field of machine tools, and, more specifically, to machine tools configured to facilitate pin removal from rotor blades.

BACKGROUND

Generally, locking pins are used for coupling rotor blades to rotors, such as turbine rotors. A typical turbine rotor assembly includes a rotor blade disk having a series of slots (e.g. finger joints) in its outer periphery and a rotor blade having corresponding slots configured to couple with the rotor blade disk. The root of the rotor blade, including the finger joints, may be locked into engagement with the rotor blade disk by one or more locking pins. A single rotor blade disk may have as many as several hundred locking pins.

While repairing or replacing rotor blades, the locking pins securing the blades to the rotor blade disks must be removed. This is typically accomplished by drilling through a centerline or axis of the locking pin. Because the length of various rotor blades is typically great, and the space between successive rotor blades is typically narrow, currently available drilling tools used for such processes are similarly long and relatively thin. This tool configuration leads to bending of the support arm during drilling operations. As a result of the bending, the drill may be misaligned with the axis of the locking pin. This may result in damage to the rotor blade and/or rotor blade disk as the drill "walks" off line during a drilling operation.

Also, the current tool configuration requires a machine that is relatively large in order to position and provide support for the support arm. Because of this size, the machine is cumbersome to setup and position during a repair. Furthermore, and as a partial product of the size and configuration of the tool, current practices do not permit alignment of the tool with a locking pin axis that is not parallel to the turbine rotor axis. If, for example, previous repairs have resulted in an off axis pin, it may not be possible to align current machines with a center line or axis of the locking pin.

BRIEF DESCRIPTION OF THE DRAWINGS

Embodiments of the present disclosure will be readily understood by the following detailed description in conjunction with the accompanying drawings. Embodiments of the disclosure are illustrated by way of example and not by way of limitation in the figures of the accompanying drawings.

DETAILED DESCRIPTION OF EMBODIMENTS

Figure 1:
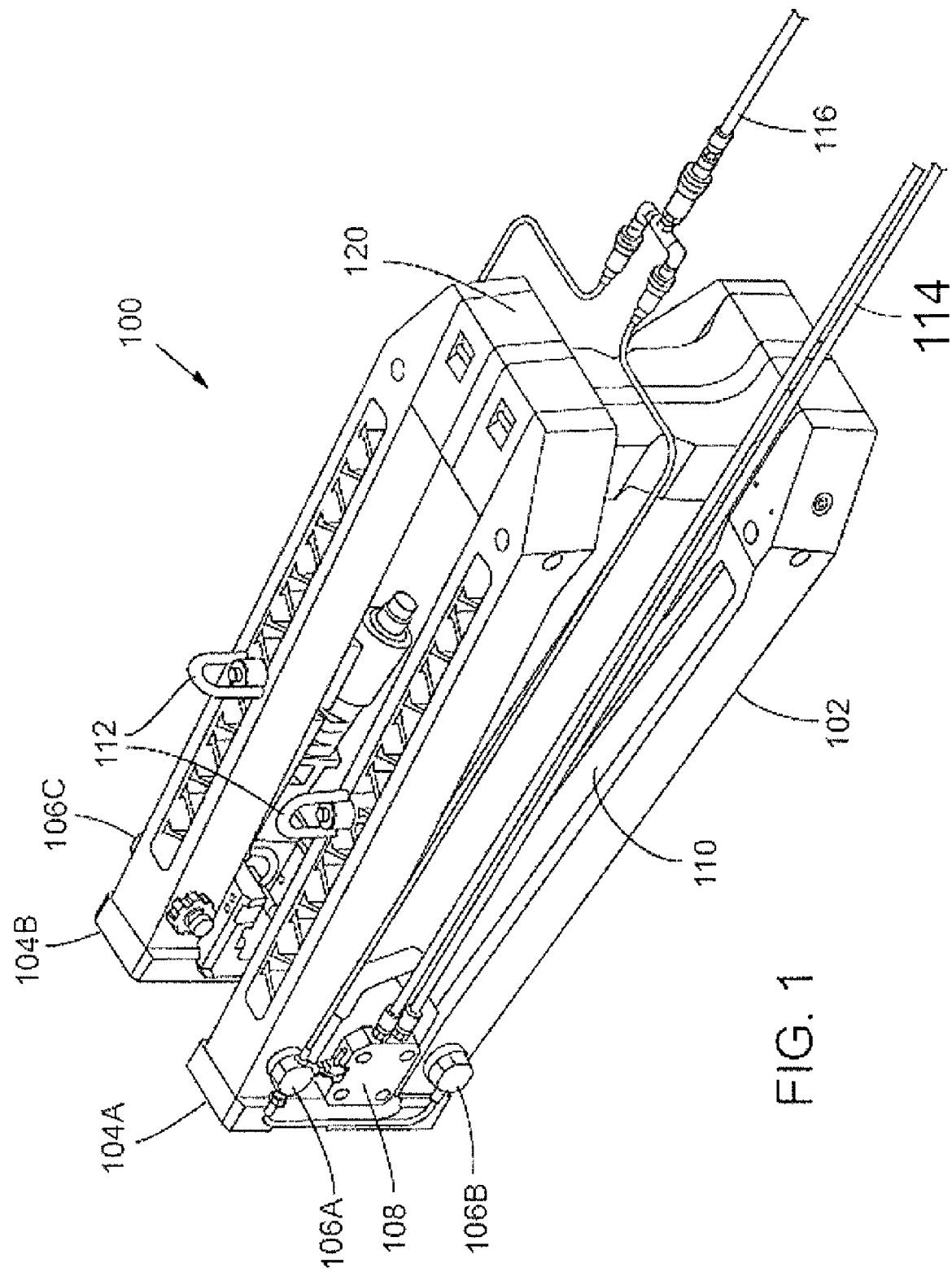
FIG. 1 illustrates a perspective view of an apparatus in accordance with various embodiments of the disclosure.

In the following detailed description, reference is made to the accompanying drawings which form a part hereof, and in which are shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

Various operations may be described as multiple discrete operations in turn, in a manner that may be helpful in understanding embodiments of the present disclosure; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present disclosure.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

In various embodiments of the present disclosure, by providing a stable drilling platform and ensuring proper alignment of a drilling component, efficiency and/or precision associated with the removal of locking pins (e.g. rotor blade pins) may be improved. In various embodiments, an apparatus may use a centering member to ensure proper alignment of the machine frame with a rotor blade pin. After proper alignment, in various embodiments, a securing mechanism, such as a coupler, may removably fix the machine frame to the rotor assembly in the alignment determined by the centering member. This may secure the machine frame to the rotor assembly and provide a stable drilling platform that helps resist unwanted flex throughout various drilling operations. In various embodiments, a drilling component may then replace the centering member, via one or more rails disposed on the machine frame, and drill a locking pin substantially along its centerline thereby reducing the potential for damage to components of the rotor assembly.

Figure 2:
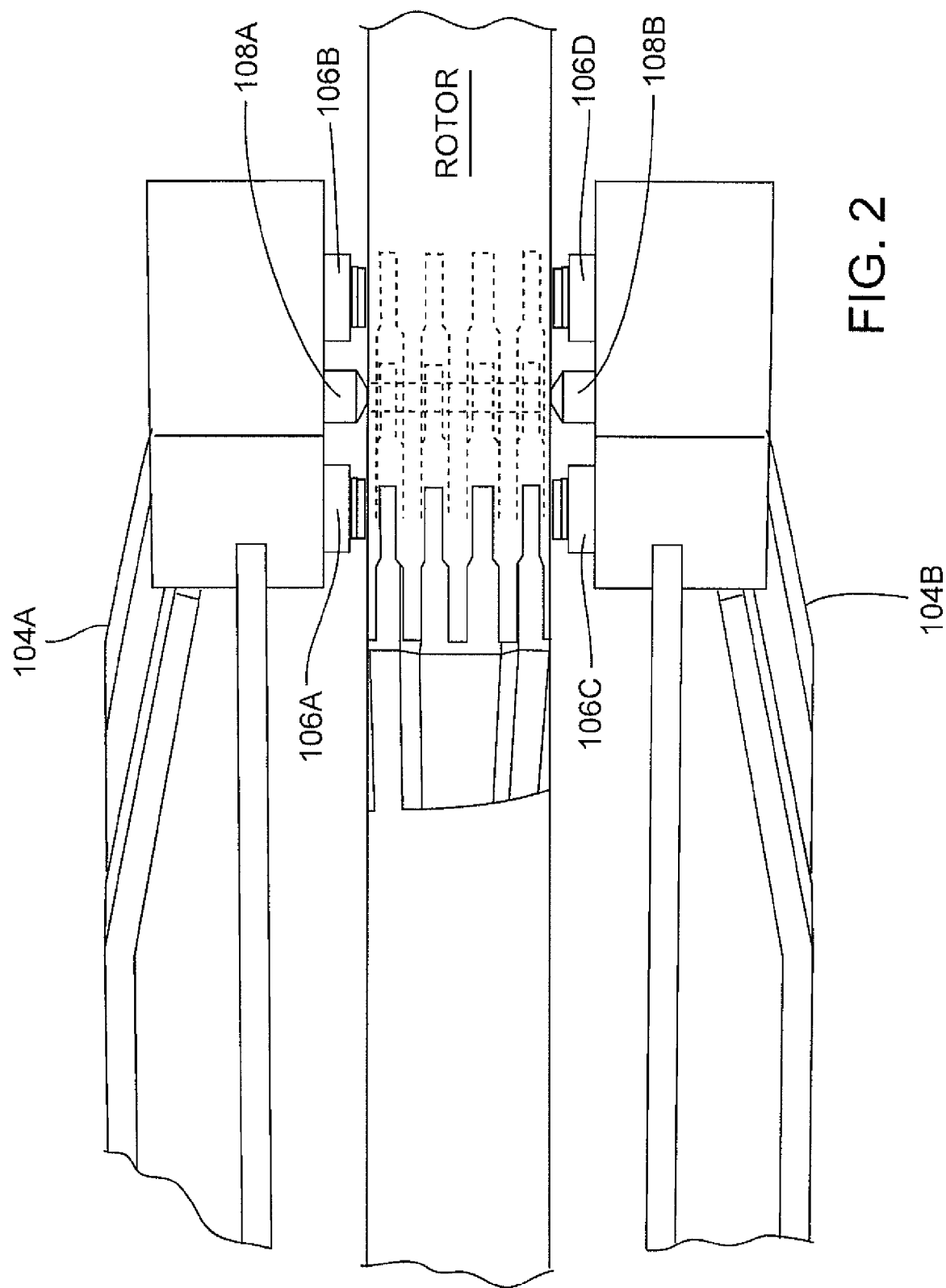
FIG. 2 illustrates a perspective view of a portion of an apparatus removably coupled to a rotor assembly in accordance with various embodiments of the disclosure.
Figure 3:
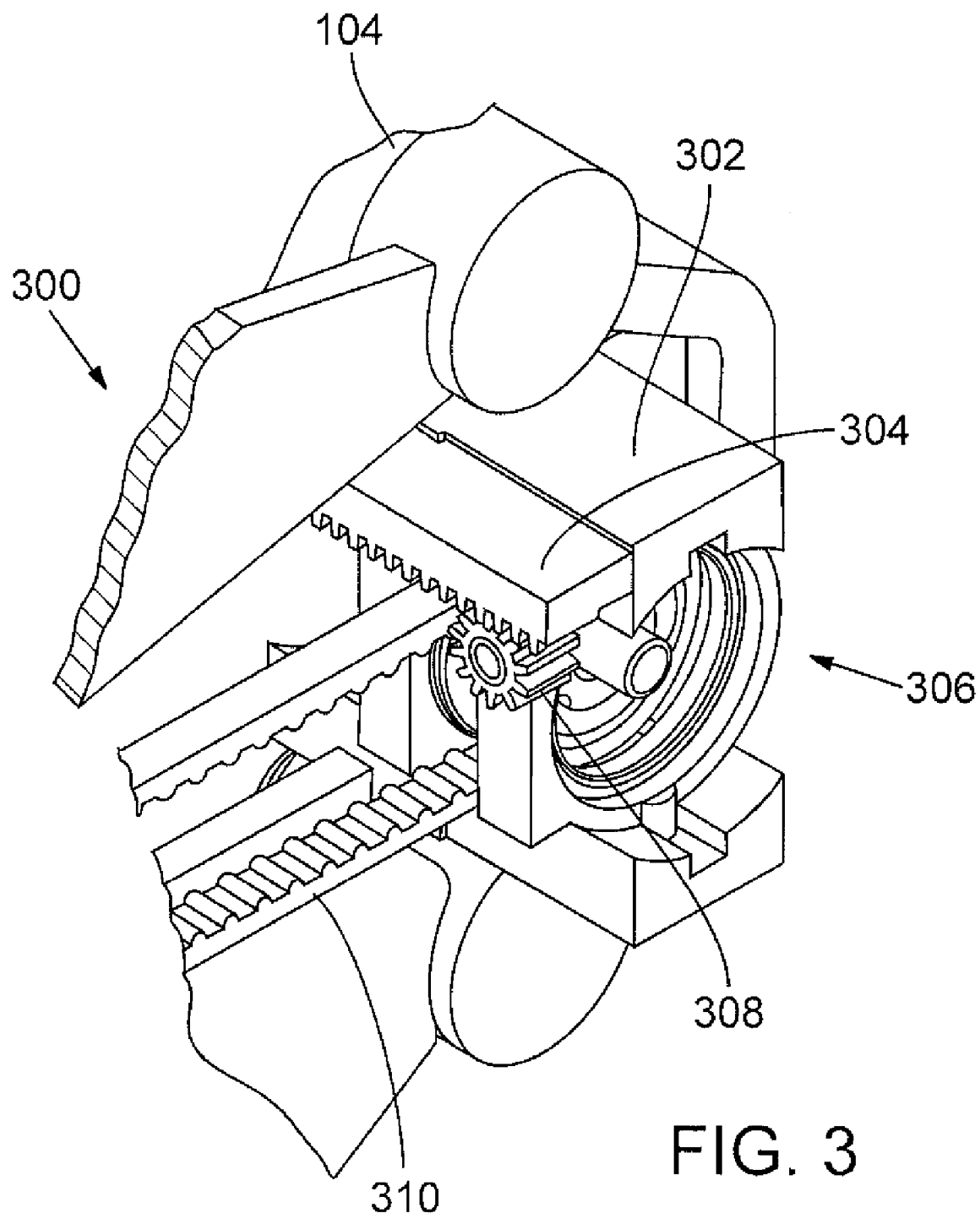
FIG. 3 illustrates a perspective view of a drilling element removably coupled to an apparatus in accordance with various embodiments of the disclosure.

With reference to FIGS. 1-3, various perspective views of an apparatus 100 configured to facilitate the removal of locking pins, including rotor blade pins, are illustrated in accordance with various embodiments. The apparatus 100, in various embodiments, may include, among other components, a machine frame or support member 102, couplers 106A-D (see FIGS. 1 and 2), and one or more removable components configured to facilitate removal of a rotor blade pin, for example, a centering member 108 and/or a drilling component 306 (see FIG. 3).

In various embodiments, the machine frame or support member 102 may comprise opposing side members 104A, 104B and a spacer plate 120 configured to allow engagement of a turbine rotor blade. The components, in various embodiments, may be arranged in a substantially C-shaped configuration with opposing side members 104A, 104B being substantially symmetric about an axis of the machine frame 102. A substantially C-shaped configuration may, in various embodiments, facilitate access to a rotor blade pin of a rotor blade. In various embodiments, other geometrical configurations may be used and adapted to fit about the rotor blade. In various embodiments, the machine frame 102 may also include other components such as, for example, hoist attachments 112 that are configured to facilitate initial positioning of the machine frame 102 with respect to a rotor blade.

In various embodiments, the spacing between the opposing side members 104A, 104B may be adjustable. This may enable the machine frame to be adapted for use on turbine rotors having a variety of rotor blade sizes and configurations. For example, in various embodiments, the machine frame 102 may include a spacer plate 120 disposed between the opposing side members 104A, 104B. In various embodiments, the spacer plate 120 may be replaceable or modifiable to enable various distances between the opposing side members 104A, 104B.

In various embodiments, the opposing side members 104A, 104B may include one or more guide rails or railings 110. In various embodiments, railings 110 may extend along the periphery of the machine frame and facilitate engagement, disengagement, and/or alignment of various cartridges, as will be discussed in more detail below. Additionally, in various embodiments, opposing side members 104A, 104B may be designed to be relatively lightweight and durable to facilitate the positioning of the machine frame 102.

In various embodiments, machine frame 102 may comprise and/or be machined from various materials including but not limited to, steel, iron, aluminum, and aluminum alloys including cast aluminum and wrought aluminum. Those of ordinary skill in the art will readily understand a multitude of other materials may be used without deviating from the disclosure. In various embodiments, the machine frame 102 may be machined in various parts and assembled, or in other embodiments, may be manufactured as a single, unitary frame.

In various embodiments, the apparatus 100 may include one or more couplers configured to couple the machine frame to a rotor assembly in a position determined by one or more other components. In various embodiments, the couplers may comprise hydraulic cylinders, clamping cylinders, and/or other components capable of removably fixing a machine frame to a rotor assembly including a rotor blade disk and/or a rotor blade. In various embodiments, the one or more couplers may enable secure positioning of the machine frame in various orientations including, but not limited to, horizontal, diagonal, vertical, and off axis orientations, wherein off axis orientations may be defined as off axis relative to the turbine rotor axis. In various embodiments, this may facilitate removal of locking pins installed in any orientation. To facilitate coupling the machine frame to the rotor assembly, the couplers may be located at various positions along the machine frame 102 in order to provide stability and/or support during various operations. For example, the couplers, in various embodiments, may be coupled to the machine frame at a distal end of the opposing side members 104A, 104B, wherein the couplers are positioned to engage a rotor blade disk. In the illustrated embodiment of FIG. 2, four couplers 106A-D are shown. More or fewer couplers or securing mechanisms may be used and disposed about frame 102 as needed to secure the frame to the rotor blade disk.

In various embodiments, one or more components may be removably coupled to the frame 102 and configured to facilitate removal of a rotor blade pin from the rotor blade. In various embodiments, the one or more components may include, for example, a centering member and/or a drilling component. Other attachments and/or combinations are contemplated. For example, in various embodiments other attachments may include components for hammering a pin, and/or for riveting or staking a replacement pin.

In various embodiments, a centering member may be coupled to machine frame 102. The centering member may be one or more positioning cartridges and include one or more alignment components, for example, hydraulic centering cylinders 108A, 108B. A positioning cartridge, in various embodiments, may interchangeably engage one or more rails 110 of the machine frame 102. In various embodiments, engagement with one or more rails may facilitate positioning and removal of the positioning cartridge with respect to the machine frame 102. In various embodiments, the positioning cartridge may determine a position of the frame wherein the frame is in alignment with a centerline of the rotor blade pin to be removed. In various embodiments, a centerline of the rotor blade pin may not be parallel to a turbine rotor axis. In various embodiments, the positioning cartridge may be configured to engage one or more rotor blade pins, wherein the rotor blade pins have center drilled holes at each end. The center drilled holes of rotor blade pins may provide a reference for the various alignment components. In various other embodiments, a centering member may align the machine frame 102 in other manners, for example, by using an imaging device such as a high resolution camera. The invention is not to be limited in this regard as other methods of alignment are contemplated.

With reference to FIG. 3, a drilling component 306 may be removably or interchangeably coupled to the frame 102 at a distal end 300 of an opposing side member 104A or 104B. In various embodiments, the drilling component 306 may be a drilling cartridge configured to interchangeably engage the one or more rails 110 of machine frame 102 to facilitate removal of a rotor blade pin. In various embodiments, the drilling cartridge may engage the rails 110 in a similar manner to that of the positioning cartridge. In various embodiments, the drilling cartridge may be aligned with a centerline of the rotor blade pin due to a previous alignment of a positioning cartridge, as will be described in more detail below. In various embodiments, the drilling cartridge may include a belt driven drill including belt 310, feed pinion 308, fixed rack 304, and a drill head cartridge 302. In various other embodiments, a right angle gear drive may be used. Those of ordinary skill in the art will readily understand various other drilling cartridges may be used and that the disclosure is not to be limited in this regard.

In various embodiments, drilling cartridges may be configured with a drill bit having a drill bit diameter and drill bit depth substantially similar to a diameter and depth of rotor blade pin to be removed. Additionally, in various embodiments, a drilling cartridge may facilitate drilling from either side of the rotor blade pin, or in other embodiments, may drill simultaneously from each side of the rotor blade pin. This may facilitate a compact system because a length of a drill bit may reduced in comparison to drill bits configured to drill only from one side of a rotor blade pin.

Referring to FIG. 2, a perspective view of an apparatus removably fixed to a rotor assembly is illustrated in accordance with various embodiments of the disclosure. In the illustrated embodiment, the machine frame 102 may include a plurality of opposing side members 104A, 104B, a plurality of couplers 106A-D, and a centering member. In various embodiments, the centering member may include positioning cartridges having alignment components 108A, 108B.

In various embodiments, the positioning cartridges may interchangeably engage rails 110 disposed on the opposing side members 104A, 104B. In various embodiments, positioning cartridges may be configured with one or more alignment components 108A, 108B that may be further configured to engage a rotor blade pin. In various embodiments, the positioning cartridges may extend a hydraulic cylinder to engage a center drilled hole of a rotor blade pin. This may facilitate alignment with the centerline of the rotor blade pin. In various embodiments, the engagement of the hydraulic cylinders with the centerline of the rotor blade pin may apply an outwardly directed force to the frame 102 by a preset amount. The preset amount, in various embodiments, may deflect the opposing side members 104A, 104B of the frame 102 so that the opposing side members 104A, 104B are substantially parallel to one another and perpendicular to the pin axis or centerline. In various embodiments, the resistance of the machine frame 102 to the deflection may facilitate a stable drilling platform.

In various embodiments, after the positioning cartridge or centering member has determined the proper alignment position of the machine frame 102, one or more securing mechanisms, such as couplers 106A-D, may couple the machine frame 102 to the rotor assembly at, for example, a rotor blade disk. The one or more couplers, in various embodiments, may couple the machine frame to the rotor assembly in the position determined by various components. For example, the couplers may be configured to couple the machine frame to the rotor assembly in a position in which the frame or a point on the frame is in alignment with a centerline of the rotor blade pin. In various embodiments, the coupling may include extending one or more clamping cylinders on each side of a rotor blade disk in substantially equal amounts of pressure to removably fix the frame to the rotor assembly. In various embodiments, the clamping members may impose a force on the rotor blade disk equivalent to the force imposed on the rotor blade pin by the positioning cartridge. In this manner, an alignment and/or deflection of the machine frame 102 may remain substantially consistent.

Figure 4:
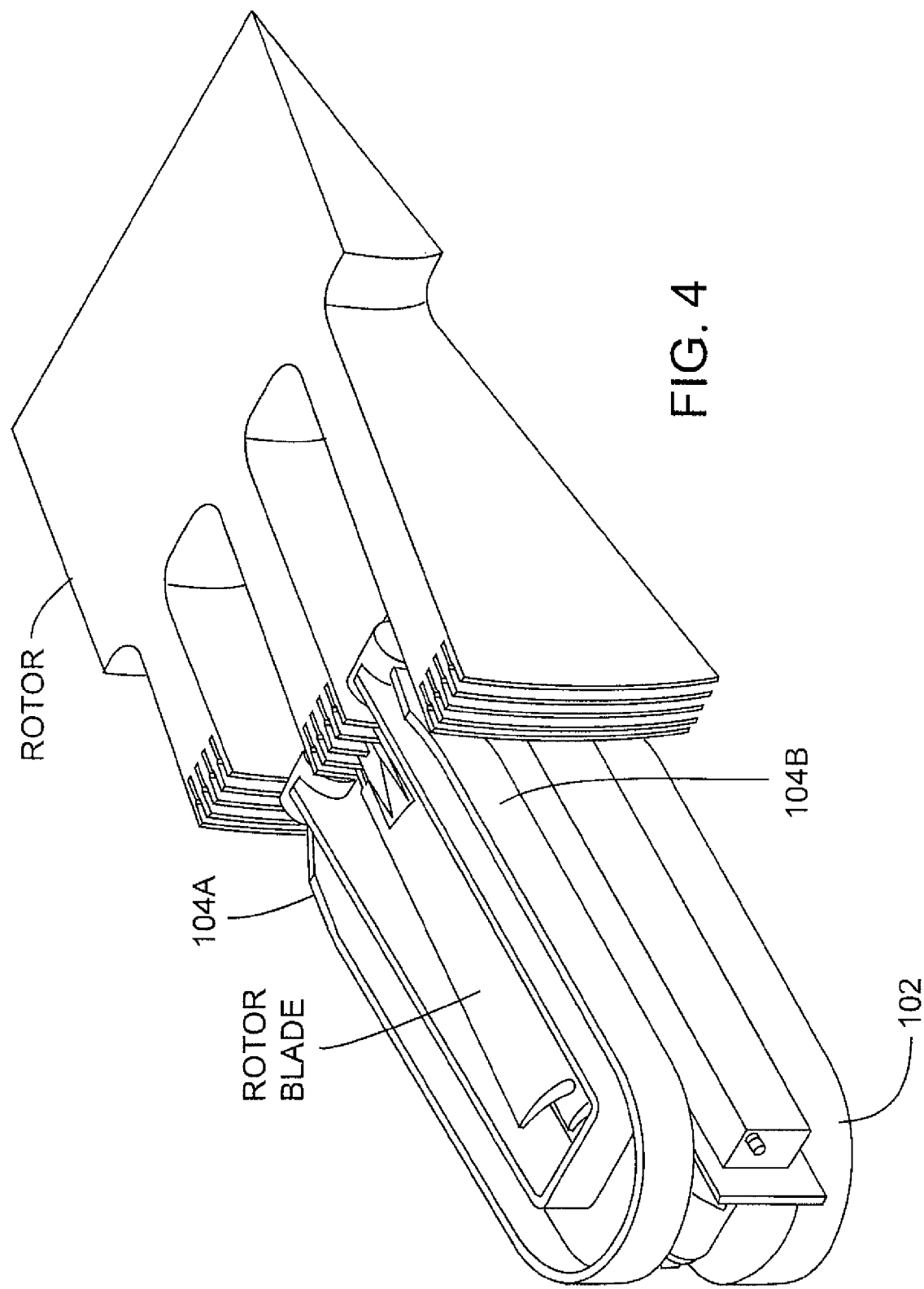
FIG. 4 illustrates a perspective view of an apparatus fixedly coupled to a rotor assembly in accordance with various embodiments of the disclosure.

Referring to FIG. 4, an oblique elevational perspective view of an apparatus fixedly coupled to a rotor assembly is illustrated. In the illustration, a rotor blade disk (e.g. a section of it) is illustrated with finger joints. A corresponding rotor blade having interlocking finger joints is illustrated as being coupled to the rotor blade disk. In various embodiments, a machine frame 102 may be positioned with the rotor blades disposed between the opposing side members 104A, 104B.

With reference to the FIGS. 1-4 where appropriate, a method of operation will be discussed in accordance with various embodiments of the disclosure. Initially, the apparatus may be roughly positioned relative to the rotor blade. For example, a hoist may position the apparatus so that a rotor blade may be disposed between the opposing side members 104A, 104B. In various embodiments, a centering member may then slidably couple to the frame and progress along the rails to a distal end adjacent the rotor blade pin. Alternatively, in various other embodiments, a centering member may be coupled to the machine frame prior to the initial positioning. The centering member, in various embodiments, may include a plurality of components positioned on both opposing side members 104A, 104B, or alternatively, a single component may be positioned on one of the opposing side members 104A, 104B.

In various embodiments, a plurality of alignment components of a centering member may extend and effectively position the machine frame in alignment with a centerline of the rotor blade pin to be removed. In various embodiments, the plurality of alignment components may be powered by a single motor having two separate gear pumps of equal displacement to ensure the alignment components move in unison. In various embodiments, alignment may be defined as a position wherein one or more of the opposing side members 104A, 104B enable a drill to effectively drill along a centerline of a rotor blade pin. In various embodiments, the centering member may use power from an independent power source such as, but not limited to, a pneumatic motor, hydraulic motor, or an electric motor to extend one or more alignment components. In the illustrated embodiment of FIG. 1, a centering member receives power via connection 114. In various embodiments, the one or more alignment components may adjust and/or orient the frame via application of a preset pressure. In various embodiments, the alignment components may deflect the opposing side members of the frame so that the ends are parallel and substantially perpendicular to the rotor blade pin axis or centerline.

In various embodiments, with the machine frame in a determined position, a stop point may be set on the rail 110 of one or more of the opposing side members 104A, 104B. The stop point may serve as a future reference point for various other components. The stop point, for example, may serve as a reference point for a drilling cartridge, wherein a drill bit of a drilling cartridge may be in substantial alignment with an axis of the rotor blade pin when the drilling cartridge engages the stop point.

In various embodiments, with the one or more alignment components extended, one or more couplers may extend from the opposing side members 104A, 104B to removably fix the frame in the orientation determined by the centering member. In various embodiments, one or more clamping cylinders may extend from the opposing side members 104A, 104B. In various embodiments, the clamping cylinders may be provided power from another independent power source different than the independent power source of the centering member. In various embodiments the independent power source may include a power source such as, but not limited to, a pneumatic motor, hydraulic motor, or an electric motor. In various embodiments, the plurality of clamping cylinders may be coupled to the same power source, for example, connection 116 of FIG. 1.

In various embodiments, the two independent power sources may be coupled to a controller or control pendant and may be controlled to provide equivalent amounts of pressure. In various embodiments, this may include the use of instruments such as pressure gauges. The control pendant, in various embodiments, may additionally control the timing of various operations. For example, the control pendant may enable the couplers to removably fix the machine frame 102 to the rotor assembly after the centering member is in an extended and stationary position. In various embodiments, the control pendant may monitor the pressure of all components to ensure proper function.

In various embodiments, after the one or more couplers, for example clamping cylinders 106A-D, have removably fixed the machine frame to the rotor assembly, the centering member may be removed from the frame 102. The centering member, in various embodiments, may retract various alignment components to disengage from the rotor blade. Subsequently, the centering member may be removed from the machine frame via rails 110 along the periphery of the opposing side members 104A, 104B. In various embodiments, the centering member may then be replaced with a drilling component such as a drilling cartridge. In various embodiments, the drilling cartridge may be placed on the one or more rails 110 along the periphery of the opposing side members 104A, 104B and moved into position wherein alignment of the drilling cartridge with the centerline of the rotor blade pin is achieved. In various embodiments, this may be facilitated through the use of the stop point along the rails 110 of the opposing side members 104A, 104B. With the drilling component in position, in various embodiments, the drilling component may drill the rotor blade pin substantially along a centerline of the rotor blade pin to remove the rotor blade pin from the rotor blade.

In various embodiments, with the rotor blade pin removed, the couplers may be released from the rotor assembly and the machine frame removed from its previously determined position.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present disclosure. For example, configurations are contemplated wherein more than one machine frame may be used simultaneously to remove a plurality of rotor blade pins. Those with skill in the art will readily appreciate that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

What is claimed is:

1. A turbine blade pin removal apparatus, comprising:
   a frame having opposing side members spaced to allow engagement of a turbine rotor assembly;
   one or more components removably coupled to the frame and configured to facilitate removal of a rotor blade pin from the turbine rotor assembly, wherein the one or more components include:
      a positioning cartridge configured to be removably coupled to one of the opposing side members of the frame and to align the frame with a centerline of the rotor blade pin; and
      a drilling cartridge configured to be removably coupled to the frame in place of the positioning cartridge after alignment of the frame to the centerline of the rotor blade pin by the positioning cartridge, wherein the drilling cartridge is configured to selectively drill the rotor blade pin; and
   one or more couplers configured to couple the frame to the turbine rotor assembly in a position aligned by the positioning cartridge; and
   an imaging device configured to facilitate positioning of the positioning cartridge relative to the rotor blade pin.

2. The apparatus of claim 1, further comprising:
   a positioning cartridge configured to interchangeably engage the opposing side members of the frame and to align the frame with the centerline of the rotor blade pin.

3. The apparatus of claim 2, wherein the positioning cartridge is further configured to deflect one or more legs of the frame to a position in which the one or more legs are substantially perpendicular to the centerline of the rotor blade pin.

4. The apparatus of claim 2, wherein the positioning cartridge is further configured to interchangeably engage the frame at a stop point, wherein the stop point is designed to provide a reference point for the one or more components.

5. The apparatus of claim 2, wherein the one or more couplers are further configured to couple to a rotor blade disk of the turbine rotor assembly after the positioning cartridge has determined the position of the frame.

6. The apparatus of claim 1,
   wherein the drilling cartridge is configured to interchangeably engage the opposing side members of the frame to facilitate removal of the rotor blade pin when the drilling cartridge is aligned with the centerline of the rotor blade pin due to a previous alignment of the frame by the positioning cartridge.

7. The apparatus of claim 6, wherein the drilling cartridge is coupled to a pneumatic air supply.

8. The apparatus of claim 1, wherein the frame is a substantially C-shaped frame configured to facilitate access to the rotor blade pin of the turbine rotor assembly.

9. The apparatus of claim 8, wherein the frame is machined from wrought aluminum.

10. The apparatus of claim 1,
    wherein the positioning cartridge is further configured to selectively deflect the opposing side members of the frame so that they are substantially perpendicular to the centerline of the rotor blade pin; and
    wherein the one or more couplers are further configured to engage a rotor blade disk of the turbine rotor assembly to couple the frame to the turbine rotor assembly with the opposing side members deflected to be substantially perpendicular to the centerline of the rotor blade pin.

11. The apparatus of claim 1, wherein the one or more components include:
    two positioning cartridges configured to be removably coupled to respective opposing side members of the frame and to align the frame with the centerline of the rotor blade pin;
    wherein the drilling cartridge is configured to be selectively and removably coupled to the frame in place of one of the two positioning cartridges after alignment of the frame to the centerline of the rotor blade pin by the two positioning cartridges.

12. A system, comprising:
    a substantially C-shaped support member configured to facilitate removal of a rotor blade pin from a turbine rotor;
    a centering member removably coupled to the substantially C-shaped support member to facilitate removal of the rotor blade pin; and
    a plurality of couplers configured to couple the substantially C-shaped support member to the turbine rotor;
    wherein the C-shaped support member includes opposing side members, and wherein the centering member is configured to selectively deflect the opposing side members to be substantially perpendicular to the rotor blade pin.

13. The system of claim 12, further comprising a first power source configured to provide a first amount of pressure to the centering member, and a second power source configured to provide a second amount of pressure to the plurality of couplers.

14. The system of claim 13, wherein the first and second power sources comprise pneumatic motors, hydraulic motors, or electric motors.

15. The system of claim 12, wherein the deflection amount is adjustable to position substantially C-shaped support member legs perpendicular to a centerline of the rotor blade pin.

16. The system of claim 12, further comprising a control pendant configured to control the centering member and the plurality of couplers.

17. The system of claim 12, further comprising:
a drilling cartridge configured to be removably coupled to the substantially C-shaped support member in place of the centering member, wherein the drilling cartridge is configured to selectively drill the rotor blade pin.

18. The system of claim 12, further comprising:
an imaging device configured to facilitate positioning of the centering member relative to the rotor blade pin.

19. A system, comprising:
a substantially C-shaped support member configured to facilitate removal of a rotor blade pin from a turbine rotor;
a centering member removably coupled to the substantially C-shaped support member and configured to deflect the substantially C-shaped support member for removal of the rotor blade pin;
a plurality of couplers configured to couple the substantially C-shaped support member to the turbine rotor; and
a drilling cartridge configured to be removably coupled to the substantially C-shaped support member in place of the centering member, wherein the drilling cartridge is configured to selectively drill the rotor blade pin.

20. The system of claim 19, further comprising a control pendant configured to control the centering member and the plurality of couplers.

21. The system of claim 19, wherein the centering member is configured to selectively deflect opposing side members of the C-shaped support member so that ends of the opposing side members are substantially perpendicular to the rotor blade pin.

* * * * *